United States Patent
Hinman et al.

(10) Patent No.: US 8,797,144 B2
(45) Date of Patent: Aug. 5, 2014

(54) AUTHORIZING RFID READER AND INHIBITING SKIMMING

(75) Inventors: Mark P. Hinman, Holly, NY (US); James Alan Katerberg, Kettering, OH (US)

(73) Assignee: Eastman Kodak Company, Rochester, NY (US)

( * ) Notice: Subject to any disclaimer, the term of this patent is extended or adjusted under 35 U.S.C. 154(b) by 440 days.

(21) Appl. No.: 13/285,274

(22) Filed: Oct. 31, 2011

(65) Prior Publication Data
US 2013/0106577 A1    May 2, 2013

(51) Int. Cl.
*G06F 21/35* (2013.01)

(52) U.S. Cl.
USPC ....... 340/10.1; 340/5.61; 340/5.62; 340/5.63; 340/426.36

(58) Field of Classification Search
CPC ... G06K 7/10267; G06F 21/35; G06F 21/445; H04L 63/0869
USPC ................. 340/10.1, 5.61, 5.62, 5.63, 426.36
See application file for complete search history.

(56) References Cited

U.S. PATENT DOCUMENTS

| | | | |
|---|---|---|---|
| 6,725,014 B1 | 4/2004 | Voegele | |
| 7,086,587 B2 | 8/2006 | Myllymaki | |
| 7,965,189 B2 | 6/2011 | Shanks et al. | |
| 7,969,286 B2 | 6/2011 | Adelbert | |
| 2009/0021343 A1 | 1/2009 | Sinha | |
| 2009/0174556 A1 | 7/2009 | Horne et al. | |
| 2009/0237223 A1 | 9/2009 | Zimmerman et al. | |
| 2010/0049977 A1* | 2/2010 | Kanemoto et al. | 713/169 |
| 2010/0148964 A1 | 6/2010 | Broer | |
| 2010/0188195 A1* | 7/2010 | Busch-Sorensen | 340/10.1 |
| 2011/0304435 A1* | 12/2011 | De Larminat et al. | 340/10.1 |

* cited by examiner

*Primary Examiner* — Daniel Wu
*Assistant Examiner* — John Bamert
(74) *Attorney, Agent, or Firm* — Christopher J. White; Raymond L. Owens

(57) ABSTRACT

An RFID reader system has an RFID tag and an RFID reader. The tag authorizes the RFID reader by receiving a plurality of successively-transmitted initial RFID read signals and determining respective initial-read signal power levels of the received initial RFID read signals. Using the determined initial-read signal power levels, a controller automatically selects an authorization sequence. A plurality of successively-transmitted authorization RFID signals are received sequentially, and respective authorization-signal power levels of the received authorization RFID read signals are determined. The determined authorization-signal power levels are automatically compared to the authorization sequence using the controller, so that the RFID reader is authorized if the determined authorization-signal power levels correspond to the authorization sequence.

7 Claims, 5 Drawing Sheets

AUTHORIZING RFID READER AND INHIBITING SKIMMING

CROSS-REFERENCE TO RELATED APPLICATIONS

The present application is related to commonly assigned, copending application U.S. application Ser. No. 13/285,264, "DETECTING RFID TAG AND INHIBITING SKIMMING," by Mark P. Hinman, et al., filed herewith, the disclosure of which is incorporated herein by reference.

FIELD OF THE INVENTION

This invention pertains to the field of radio-frequency communication between radio-frequency identification (RFID) tags and RFID readers, and more particularly to inhibiting or restraining unauthorized reads of tag data, or otherwise making it more difficult to perform unauthorized reads of tag data.

BACKGROUND OF THE INVENTION

Various electronic equipment or devices can inter-communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), or 2.4 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source and are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS 1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS 1 terms) a 10" skillet. Each 10" skillet manufactured has the same UPC code, called a "Global Trade Item Number" (GTIN). Each 10" skillet the manufacturer produces is an "instance" of the product, in GS 1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

However, RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data. This process is called "skimming," and such rogue readers are referred to as "skimmers." The skimmer can later replay the stored data (a "replay attack") to pretend to be the skimmed tag. This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Horne et al. describes an RFID blocker that disrupts an RFID reader's signal to a tag when the blocker is physically near the tag. However, the blocker will disrupt all accesses, not just unauthorized access. In another scheme, U.S. Patent Publication No. 2009/0021343 by Sinha describes jamming or spoofing skimmers, either from authorized electronics or from intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag.

There is, therefore, a continuing need for a tag to determine that it is being accessed by an authorized reader, and not a skimmer.

SUMMARY OF THE INVENTION

According to an aspect of the present invention, in an RFID reader system including an RFID tag and an RFID reader, there is provided a method of authorizing the RFID reader, the method comprising the RFID tags performing the following steps:

an initial-read signal receiving step of receiving a plurality of successively-transmitted RFID initial-read signals and determining respective initial-read signal characteristics of the received initial-read signals, wherein each characteristic is selected from the group consisting of a received power level of the respective read signal, the time interval between the respective read signal and a preceding or following read signal, and identification data included in the respective read signal, whereby each characteristic has a respective type of "power level," "time interval," or "identification data," respectively;

using the determined initial-read signal characteristics, automatically selecting an authorization sequence using a controller;

an authorization-signal receiving step of receiving a plurality of successively-transmitted RFID authorization signals sequentially, and determining respective authorization-signal characteristics of the received authorization signals, wherein each characteristic is selected from the group consisting of a received power level of the respective authorization signal, the time interval between the respective authorization signal and a preceding or following authorization signal, and identification data included in the respective authorization signal, whereby each characteristic has a respective type of "power level," "time interval," or "identification data," respectively; and automatically comparing the determined authorization-signal characteristics to the authorization sequence using the controller, so that the RFID reader is authorized if the determined authorization-signal characteristics correspond to the authorization sequence.

According to another aspect of the present invention, in an RFID reader system including an RFID tag and an RFID reader, there is provided a method of authorizing the RFID reader, the method comprising the RFID tags performing the following steps:

automatically selecting an authorization sequence using a controller;

an authorization-signal receiving step of receiving a plurality of successively-transmitted RFID authorization signals sequentially, and determining respective authorization-signal characteristics of the received authorization RFID read signals, wherein each characteristic is selected from the group consisting of a received power level of the respective authorization signal, the time interval between the respective authorization signal and a preceding or following authorization signal, and identification data included in the respective authorization signal, whereby each characteristic has a respective type of "power level", "time interval", or "identification data", respectively;

automatically comparing the determined authorization-signal characteristics to the authorization sequence using the controller, so that the RFID reader is authorized if the determined authorization-signal characteristics correspond to the authorization sequence.

An advantage of this invention is that it permits a tag to determine if it is being accessed by an authorized reader. This inhibits passive skimming when an authorized reader is not present. Various embodiments also permit the tag to determine if any skimmers are present and to take appropriate action. Moreover, the use of multiple authorization signals can cause replay attacks by standard skimmers not to be effective: if a reader detects a tag response after a single authorization signal, or at another time not corresponding to the appropriate point in the sequence of authorization signals, the reader knows a skimmer is attempting a replay attack, and ignores the replayed data. In various embodiments, characteristics of the authorization signals are an authorization sequence used by the tag to authorize the reader to access the tag. These embodiments advantageously provide authorization without requiring complex cryptographic circuitry in the RFID tag. They increase the number of parameters that a skimmer has to simulate to perform an unauthorized access to a tag. This increases the difficulty of skimming compared to prior systems that authorize based only on easily-skimmable data transmitted as part of a read signal. For example, some embodiments use the time between successive read signals as part of the authorization sequence, and it can be very difficult for a skimmer to reproduce these times precisely.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because data communications algorithms and systems are well known, the present description will be directed in particular to algorithms and systems forming part of, or cooperating more directly with, methods described herein. Other aspects of such algorithms and systems, and hardware or software for producing and otherwise processing the communication signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Figure 1:
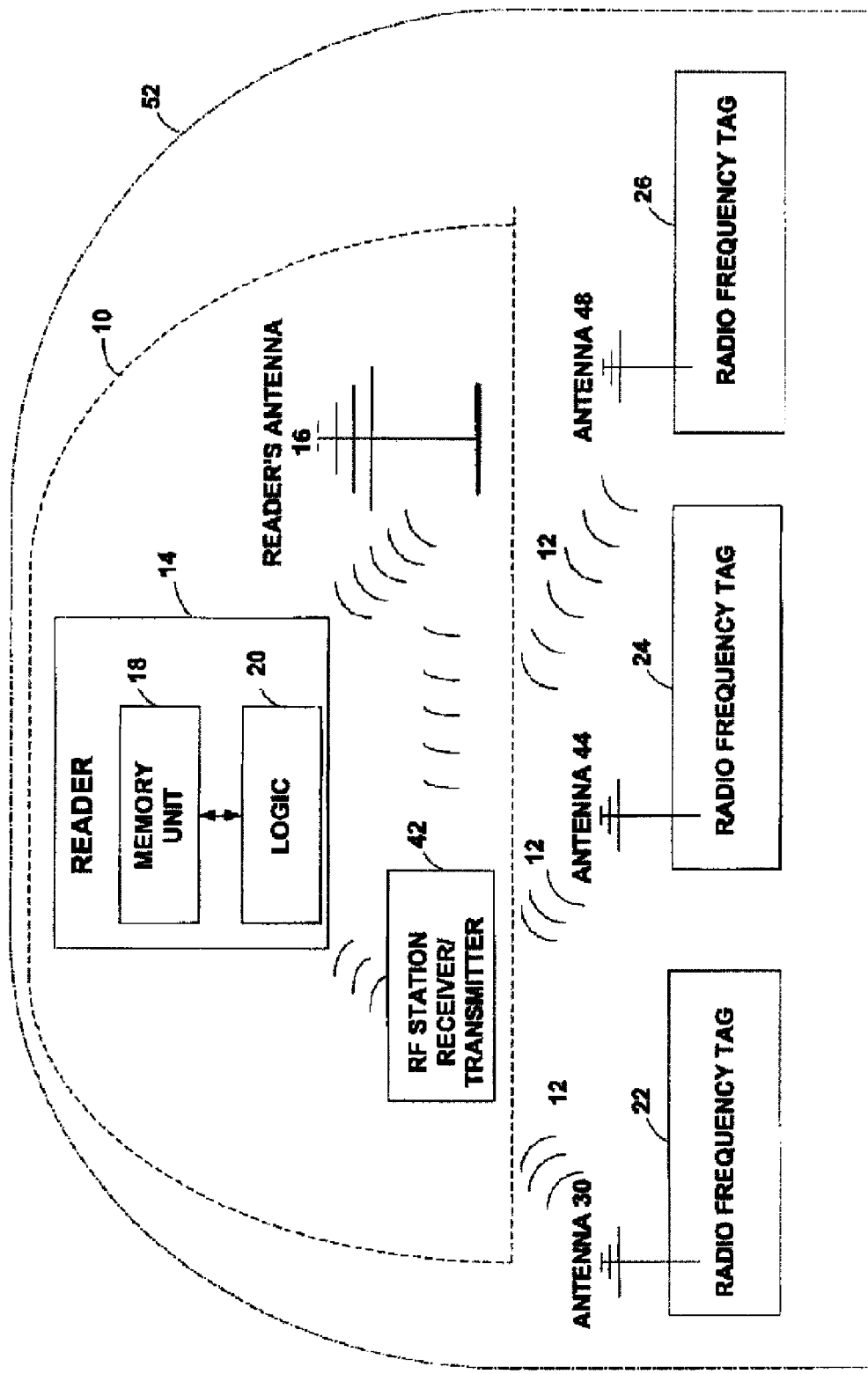
FIG. 1 is a block diagram of an RFID system according to various embodiments.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SGTINs of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52.

Figure 2:
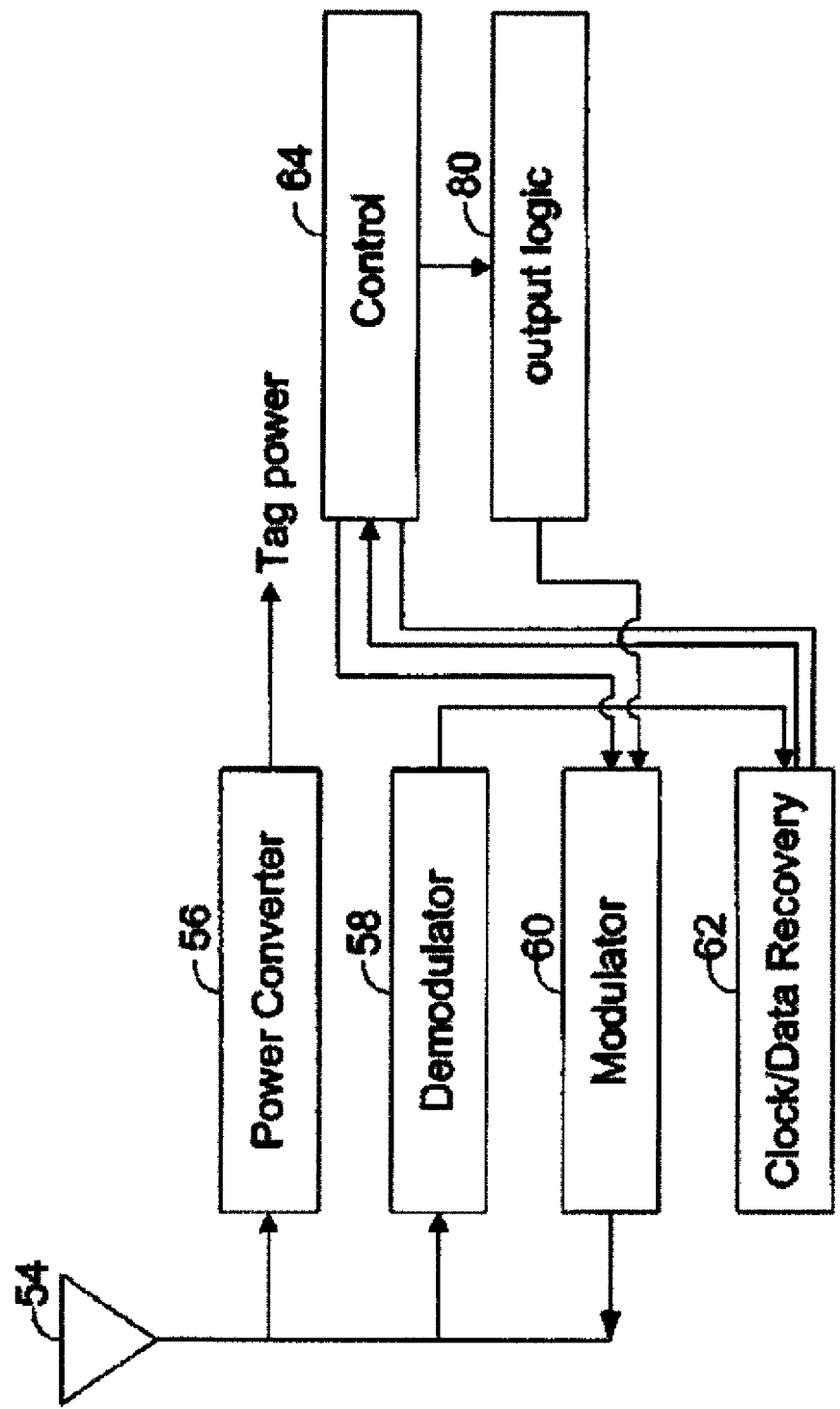
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
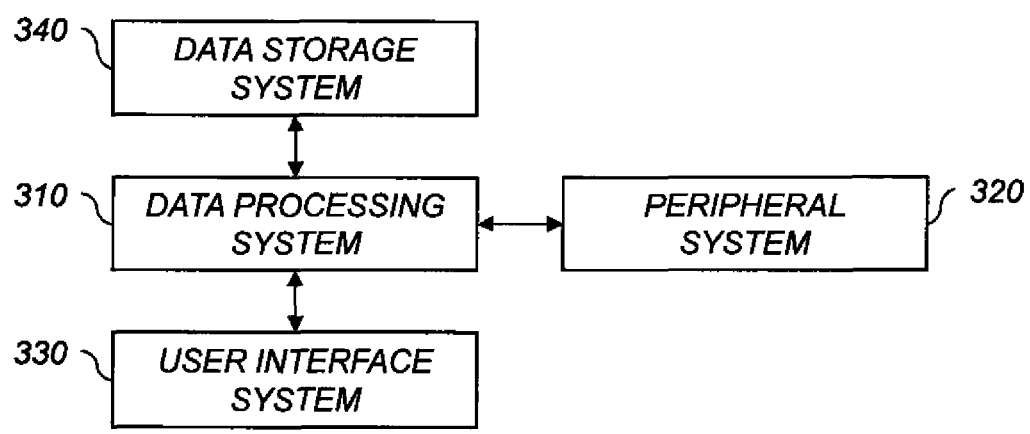
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
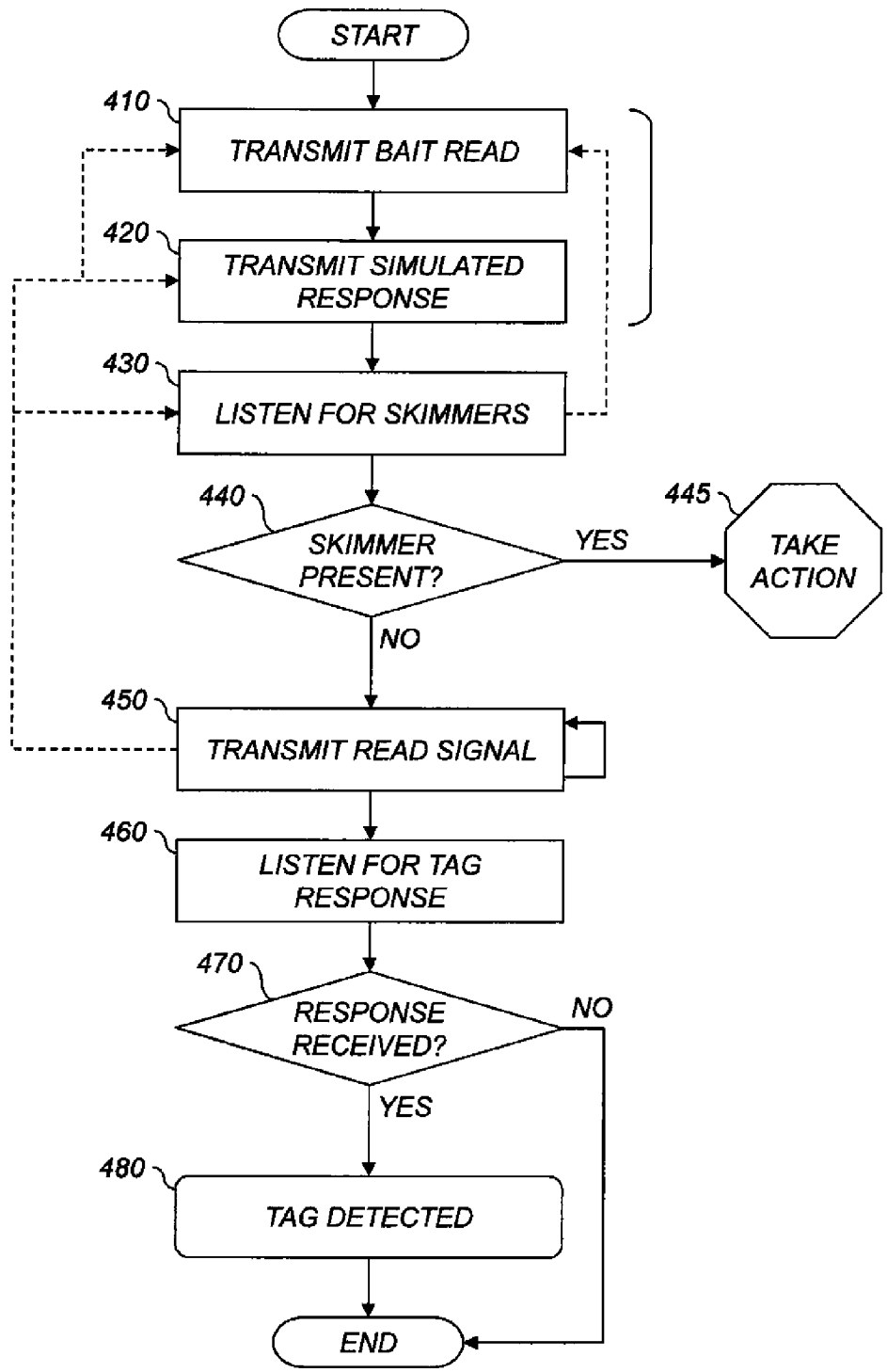
FIG. 4 shows a method of detecting an RFID tag according to various embodiments.

FIG. 4 shows a method of detecting an RFID tag according to various embodiments. Processing begins with step 410.

In step 410, a bait RFID read signal is transmitted at a bait power level. The term "bait" signifies that this signal is not intended to cause tags in range 52 (FIG. 1) to respond. Instead, the bait signal is to cause a skimmer in range 52 to recognize that an authorized RFID reader (non-skimmer) is present. The read signal is formatted to cause RFID tags to respond, e.g., as described above with respect to FIG. 2. However, authorized RFID tags in range 52 do not respond to the bait RFID read signal. Step 410 is followed by step 420. A "signal" is any transmission that carries information between reader and tag, so a continuous, non-modulated (CW) carrier wave is not considered to be a signal. However, a carrier wave can be modulated to transmit signals, as discussed above. For example, a signal can be a synchronization pulse or frame, or a full message transmission. An example of a message transmission is given on page 36 of the GS1 Class-1, Generation-2, UHF MID Protocol for Communications at 860 MHz-960 MHz, ver. 1.2.0 (corresponding to ISO 18000-6c). The message includes, in order, a select command from the reader, a query command from the reader, a response from the tag with a random number, an acknowledgement from the reader, data from the tag, and a query response. A signal can also be one component of a message, e.g., a select or other command, an acknowledgement, a packet of data from the tag, or a query response.

In step 420, a simulated response signal is transmitted by the reader at a simulated-response power level. The simulated response is the second half of the bait: it is a properly-formatted response from an RFID tag, and causes the skimmer to think that a tag is present in range 52. This permits detecting skimmers even if no tags are present in range 52, e.g., to clear range 52 of skimmers before bringing a tagged container into range 52. Step 420 is followed by step 430.

In various embodiments, e.g., those using backscatter, steps 410 and 420 are combined. The RFID reader can transmit a combined bait signal including the carrier and the fluctuations that would be caused by a tag's backscattering data. This is indicated graphically by the rounded bracket at steps 410, 420.

Step 430 is a skimmer-detection step. In step 430, the reader monitors a selected reader frequency for a selected detection time. That is, the reader listens for a skimmer to take the bait. In some embodiments, the reader does not transmit during the skimmer-detection step. In other embodiments, the reader transmits a carrier during the skimmer-detection step to permit a skimmer simulating a passive RFID tag to transmit by backscatter modulation. In embodiments in which the tags respond on a different frequency than the reader's carrier frequency (e.g., active-tag systems), the skimmer-detection step can further include monitoring a selected response frequency for the selected detection time. Different applications can have different selected detection times; detection times can be selected based on the expected time between communications between the reader and the RFID tags. For example, in an inventory control application requiring the reader to communicate with a large number of tags, the selected detection time can be low, e.g., from about 1 ms to a few seconds. In examples in which security is of greater importance than throughput, e.g., tags for theft detection, the selected detection time can larger, ranging from seconds to minutes. Step 430 is followed by decision step 440. Optionally, steps 410-430 can be repeated to continue detecting skimmers.

Decision step 440 decides whether a skimmer is present. A skimmer is determined to be present if a skimmer RFID read signal is detected during the selected detection time. In embodiments in which the reader does not transmit during the detection time, any RFID read signal, especially one conforming to the relevant standards for the tag, is presumed to come from a skimmer. In various embodiments, read signals at higher-than-normal power levels can be determined to be from a skimmer, since skimmers typically operate at unusually high (even non-standard) power levels for increased range. Alternatively, read signals within a certain range, determined by time-of-flight from the bait signal, can be determined to be from skimmers. Alternatively, multiple antennas can be used to triangulate the location of a suspected skimmer, and any suspected skimmer located outside a pre-defined legal antenna area can be determined to in fact be a skimmer. If no skimmer is determined to be present, the next step is step 450. If a skimmer is determined to be present, tag detection comes to an end, permitting appropriate action to be taken (step 445). For example, an alert can be reported to an operator or the RFID system can be deactivated. Alternatively, an image of range 52 (FIG. 1) can be captured, correlated with the time of skimmer detection, to provide forensic evidence of the presence of the skimmer. A reader with multiple spaced-apart antennas, or multiple cooperating readers, can triangulate the position of the skimmer. Attempted transmissions between the skimmer and either the reader or RFID tags can be recorded as forensic evidence. In various embodiments in which the skimmer has altered or attempted to alter data stored on the RFID tag, appropriate action can include the reader's sending a command to the RFID tag to label the tag as corrupted or to deactivate (kill) it. An indication of the skimming, e.g., a flag bit or code, can be stored in the RFID tag or a memory operatively connected to the RFID reader.

In step 450, if a skimmer is not determined to be present, the tag is accessed. The reader transmits a read signal. As shown, step 450 is repeated to transmit multiple read signals sequentially.

In various embodiments, each read signal is transmitted at a respective read power level. At least two of the read power levels are different from each other, so that the sequence of different power levels is less likely to be produced by a skimmer that evades detection in the preceding steps. At least one of the read power levels is lower than the bait power level, and at least one of the read power levels is lower than the simulated-response power level. As discussed above, skimmers generally use high power levels. Using lower power levels therefore presents a further barrier to a skimmer wanting to evade detection. The particular sequence of the power levels transmitted by the reader can be used as a signal to validate to an RFID tag that the reader is an authorized reader, so that the tag will activated to respond to the reader; this is discussed below, with reference to step 530 shown in FIG. 5.

In various embodiments, each read signal after the first-transmitted read signal is transmitted a selected time interval after the preceding read signal. In other embodiments, each read signal includes respective authorization data. Combinations of power level, time interval, and authorization data can also be used. In various embodiments, each read signal has a signal characteristic selected from the group consisting of a received power level of the respective read signal, the time interval between the respective read signal and a preceding or following read signal, and identification data included in the respective read signal. Each characteristic therefore has a respective type of "power level", "time interval", or "identification data", respectively, as discussed further below with respect to step 510. The signal characteristics of the read signals compose an authorization sequence, so the sequential transmission of the multiple read signals transmits the authorization sequence of the signal characteristics. This is discussed further below with respect to step 550 shown in FIG. 5. In various embodiments, the type of a first selected one of the read signal characteristics (e.g., power level) is different than the type of a second selected one of the read signal characteristics (e.g., data value).

Step 450 is followed by step 460, or optionally by steps 410, 420 or 430.

In various embodiments, step 450 is followed by step 430. At least one transmitted read signal is also an additional bait signal. The transmission of the signal is followed an additional skimmer detection step (step 430) of monitoring a selected reader frequency for a selected detection time to enable the reader to detect signals from a skimmer. Each time through step 430, the same selected detection time or a different selected detection time can be used, and the same selected reader frequency or a different selected reader frequency can be used.

In various embodiments, step 450 is followed by step 420. At least one transmitted read signal is also an additional bait signal. The transmission of the signal is followed by the transmission of one or more appropriate simulated response signals from the reader, as described above. In embodiments in which steps 410 and 420 are combined, as discussed above, step 450 is followed by step 410 In various embodiments, the transmission (step 420 and optionally step 410) is followed by detection (step 430), as discussed above.

In step 460, the reader monitors a selected response frequency for a tag response from an RFID tag. Step 460 is followed by decision step 470.

Decision step 470 decides whether the tag has been detected. The tag has been detected (state 480) if the tag response is received. If no response is received, no tag is present.

Figure 5:
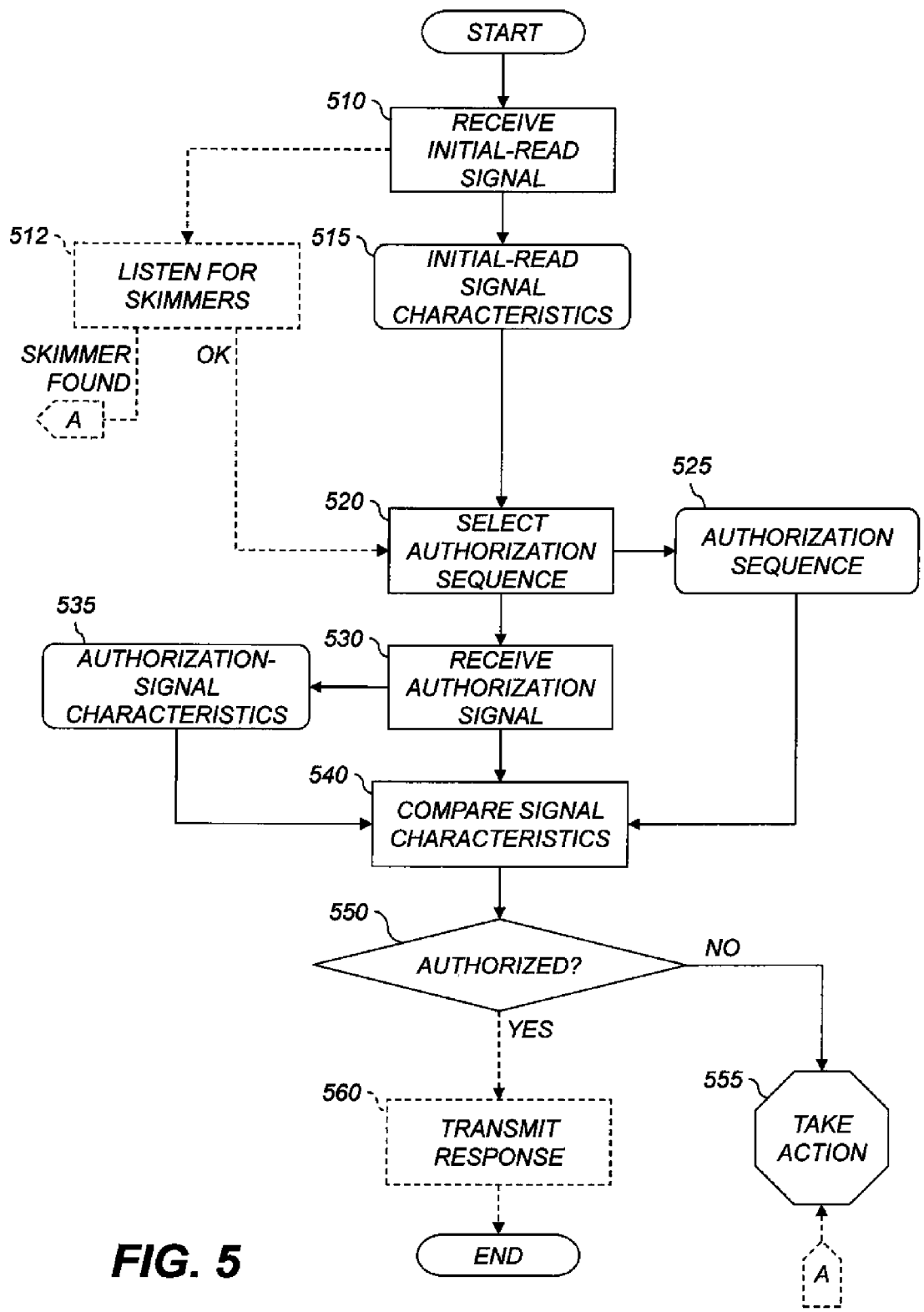
FIG. 5 shows a method of authorizing an RFID reader according to various embodiments.

FIG. 5 shows a method of authorizing an RFID reader according to various embodiments. This method can be performed by an RFID tag in an RFID reader system, and the following discussion is written to that embodiment. However, the method can also be performed by other RFID devices, e.g., by a reader to bait skimmers. Processing begins with step 510.

In step 510, which is an initial-read signal receiving step, a plurality of successively-transmitted RFID initial-read signals is received. Respective initial-read signal characteristics of the received initial-read signals are determined. Each characteristic can be a received power level of the respective read signal, the time interval between the respective read signal and a preceding or following read signal, or identification data included in the respective read signal. Each characteristic therefore has a type: received power levels have type "power level", time intervals have type "time interval", and identification data values extracted from the respective read signal have type "identification data", respectively. Multiple characteristics can be determined for each initial-read signal, and those characteristics can have different types. The type of a first selected one of the initial-read signal characteristics (e.g., a power level) can be different than the type of a second selected one of the initial-read signal characteristics (e.g., a time interval). Step 510 is optionally followed by step 512 and produces initial-read signal characteristics 515, which are provided to step 520.

In various embodiments, the initial-read signals are at respective initial-read signal power levels (as received), and at least two of the initial-read signal power levels are different from each other. In various embodiments, if multiple signals, all of the same power level (within a selected tolerance, as discussed below) are detected, it is assumed that a skimmer is trying to elicit reads from the tag, and the tag does not respond. In step 520, using the determined initial-read signal characteristics 515, a controller on the tag automatically selects an authorization sequence. The initial-read signal characteristics 515 select a key (the authorization sequence) that the reader will later use to communicate with the tag. In other embodiments, the controller selects, or is pre-programmed with, the authorization sequence, and steps 510 and 512, and characteristics 515, are not used. Step 520 is followed by step 530 and produces authorization sequence 525, which is provided to step 540.

In step 530, which is an authorization-signal receiving step, a plurality of successively-transmitted RFID authorization signals are received sequentially. Respective authorization-signal characteristics of the received authorization signals are determined. Each characteristic can be a received power level of the respective authorization signal, the time interval between the respective authorization signal and a preceding or following authorization signal, or identification data included in the respective authorization signal. The type of a first selected one of the authorization-signal characteristics (e.g., a time interval) can be different than the type of a second selected one of the authorization-signal characteristics (e.g., a power level).

Step 530 is followed by step 540 and produces authorization-signal characteristics 535, which are provided to step 540.

In various embodiments, the initial signals received in step 510 are the bait signals transmitted by the RFID reader in steps 410 and 420 (FIG. 4). The authorization signals received in step 530 are the read signals transmitted by the RFID reader in step 450 (FIG. 4). In other embodiments, the read signals (step 450) include both the initial signals (step 510) and the authorization signals (step 530).

In step 540, authorization-signal characteristics 535 obtained from the received authorization signals are automatically compared to authorization sequence 525 using the controller. In an example, the authorization sequence specifies (by values, ratios, or differences) the power levels required for successive authorization signals, and the controller determines whether those levels were received in the order specified in the authorization sequence. In another example, the authorization sequence requires that the data in the authorization signals and the timing between successive authorization signals conform to selected values, and the controller checks the signals received against those specifications. Step 540 is followed by decision step 550.

Decision step 550 decides whether the reader is authorized. In various embodiments, the RFID reader is authorized if the determined authorization-signal characteristics 535, e.g., power levels, correspond to the authorization sequence, as determined by the comparison (step 540; see below for tolerances). In various embodiments, at least one of the authorization-signal power levels is lower than all of the initial-read signal power levels and at least two of the authorization-signal power levels are different from each other. In some embodiments, the authorization sequence can specify ratios between the power level of successive authorization signals, or for sequences of at least five signals.

In various embodiments, if multiple authorization signals are detected that all have the same power level (within a selected tolerance, discussed below) are detected, and the signal power levels do not correspond to the authorization sequence, the tag determines that a skimmer is trying to elicit a response from the tag, so the tag determines that the reader is not authorized. As in the embodiments discussed below with respect to step 512, an authorized reader can be determined to be unauthorized in the presence of a skimmer to reduce vulnerability of the RFID system to attack.

If the reader is authorized, the next step is optional step 560. If not, the authorization process terminates at step 555, and appropriate action can be taken. For example, step 555 can include reporting an alert (as opposed to transmitting valid data) by RFID or another communications mechanism, either immediately or on the next communication with a reader or an authorized reader. Other examples include the tag closing itself to outside communications for a selected period of time, or the tag self-destructing or otherwise rendering itself permanently inoperative for its intended function (kill).

In optional step 560, after the comparing step, if the RFID reader is authorized, it can communicate with the tag. The tag therefore transmits a response to the RFID reader. If the reader is not authorized, the tag does not transmit a response.

In optional step 512, after initial-read signal receiving step 510 and before the authorization-signal receiving step 530, the tag listens for a selected length of time for RFID read signals from a skimmer (in various embodiments, any signals). If any RFID read signals are detected, the tag determines that a skimmer is present, and appropriate action can optionally be taken (step 555 is the next step, through connector A). That is, the presence of a skimmer causes the tag to consider the reader not to be authorized. Even if there is a legitimate reader present, determining that the reader is not authorized when a skimmer is detected reduces the risk of loss of data to the skimmer, and thus of replay attacks. Step 512 is followed by step 520 if no skimmer is found.

In determining whether characteristics such as power levels and time intervals of initial-read signals, read signals, or authorization signals correspond to desired values (e.g., authorization sequences), the controller preferably quantizes or otherwise rejects noise that might skew the results. Environmental factors can lead to interference, reflections, and fading that the controller preferably rejects. In general, for quantized characteristics, a measurement of a characteristic is considered to correspond to the respective element of the sequence if the closest quantized value to the measured value equals the respective element of the sequence.

Reader power levels and sensitivities can vary widely depending on jurisdiction (e.g., US, Japan), frequency band, antenna configuration, RF environment, and equipment manufacturer. An example of a range of power levels capable of being transmitted by a reader and discriminated by a tag is from −27 dBm transmit power from the reader down to −70 dBm in 1 dBm steps. This is 44 distinct power levels, or over five (~5.4) bits of discrimination in power level. Therefore, in this example, the power levels of read signals, authorization signals, or other signals having characteristics of type "power level" convey at least five bits of information each. In this example, therefore, two power levels are considered to be different from each other if they differ by more than 0.5 dBm. More or fewer discrete power levels can be transmitted, e.g., a number of levels that is an integral power of two so the level carries a whole number of bits of information.

In an example of signals having characteristics of type "time interval", the reader can transmit read signals or other signals to the tag once per millisecond, or on millisecond granularity, and two time intervals can be considered to correspond if they are within 0.5 ms of each other. In another example, the reader and tag have a data rate between 40 and 80 kbit/s (ISO 18000-6c, corresponding to the EPC Gen 2 Class 1 UHF standard in the 860-960 MHz band). In yet another example, the TEXAS INSTRUMENTS TRF7960 RFID analog front-end integrated circuit device (IC) can transmit or receive 106 kbps, 212 kbps, 424 kbps, or 848 kbps (ISO 14443A/B in the 13.56 MHz band), which is total bit rate, not payload throughput. Two time intervals can be considered to correspond if they are separated by less than the reciprocal of the bit rate.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

| | |
|---|---|
| 10 | base station |
| 12 | air interface |
| 14 | reader |
| 16 | reader's antenna |
| 18 | memory unit |
| 20 | logic unit |
| 22, 24, 26 | RFID tag |
| 30 | antenna |
| 42 | RF station |
| 44, 48 | antenna |
| 52 | range |
| 54 | antenna |
| 56 | power converter |
| 58 | demodulator |
| 60 | modulator |
| 62 | clock/data recovery circuit |
| 64 | control unit |
| 80 | output logic |
| 310 | data-processing system |
| 320 | peripheral system |
| 330 | user-interface system |
| 340 | data-storage system |

| | |
|---|---|
| 410 | transmit bait read step |
| 420 | transmit simulated response step |
| 430 | listen for skimmers step |
| 440 | skimmer present? decision step |
| 445 | take action step |
| 450 | transmit read signal step |
| 460 | listen for tag response step |
| 470 | response received? decision step |
| 480 | tag-detected state |
| 510 | receive initial-read signal step |
| 512 | listen for skimmers step |
| 515 | initial-read signal characteristics |
| 520 | select authorization sequence step |
| 525 | authorization sequence |
| 530 | receive authorization signal step |
| 535 | authorization-signal characteristics |
| 540 | compare signal characteristics step |
| 550 | authorized? decision step |
| 555 | take action step |
| 560 | transmit response step |

The invention claimed is:

1. In an RFID reader system including an RFID tag and an RFID reader, a method of authorizing the RFID reader, the method comprising the RFID tags performing the following steps:
an initial-read signal receiving step of receiving a plurality of successively-transmitted RFID initial-read signals and determining respective initial-read signal characteristics of the received initial-read signals, wherein each characteristic is selected from the group consisting of a received power level of the respective read signal, the time interval between the respective read signal and a preceding or following read signal, and identification data included in the respective read signal, whereby each characteristic has a respective type of "power level," "time interval," or "identification data," respectively;
using the determined initial-read signal characteristics, automatically selecting an authorization sequence using a controller;
an authorization-signal receiving step of receiving a plurality of successively-transmitted RFID authorization signals sequentially, and determining respective authorization-signal characteristics of the received authorization signals, wherein each characteristic is selected from the group consisting of a received power level of the respective authorization signal, the time interval between the respective authorization signal and a preceding or following authorization signal, and identification data included in the respective authorization signal, whereby each characteristic has a respective type of "power level," "time interval," or "identification data," respectively;
automatically comparing the determined authorization-signal characteristics to the authorization sequence using the controller, so that the RFID reader is authorized if the determined authorization-signal characteristics correspond to the authorization sequence; and
after the initial-read signal receiving step and before the authorization-signal receiving step, listening for RFID read signals from a skimmer, and, if any read signals from a skimmer are detected, determining that the RFID reader is not authorized.

2. The method according to claim 1, further comprising, after the comparing step, if the RFID reader is authorized, transmitting a response to the RFID reader.

3. The method according to claim 1, wherein the type of a first selected one of the initial-read signal characteristics is different than the type of a second selected one of the initial-read signal characteristics.

4. The method according to claim 1, wherein the type of a first selected one of the authorization-signal characteristics is different than the type of a second selected one of the authorization-signal characteristics.

5. In an RFID reader system including an RFID tag and an RFID reader, a method of authorizing the RFID reader, the method comprising the RFID tags performing the following steps:
automatically selecting an authorization sequence using a controller;
an authorization-signal receiving step of receiving a plurality of successively-transmitted RFID authorization signals sequentially, and determining respective authorization-signal characteristics of the received authorization RFID read signals, wherein each characteristic is selected from the group consisting of a received power level of the respective authorization signal, the time interval between the respective authorization signal and a preceding or following authorization signal, and identification data included in the respective authorization signal, whereby each characteristic has a respective type of "power level," "time interval," or "identification data," respectively;
automatically comparing the determined authorization-signal characteristics to the authorization sequence using the controller, so that the RFID reader is authorized if the determined authorization-signal characteristics correspond to the authorization sequence; and
before the authorization sequence selecting step and before the authorization-signal receiving step, listening for RFID read signals from a skimmer, and, if any read signals from a skimmer are detected, determining that the RFID reader is not authorized.

6. The method according to claim 5, further comprising, after the comparing step, if the RFID reader is authorized, transmitting a response to the RFID reader.

7. The method according to claim 5, wherein the type of a first selected one of the authorization-signal characteristics is different than the type of a second selected one of the authorization-signal characteristics.

* * * * *